(12) United States Patent
Xiao et al.

(10) Patent No.: US 11,210,681 B2
(45) Date of Patent: Dec. 28, 2021

(54) METHODS AND APPARATUS TO FORECAST NEW PRODUCT LAUNCH SOURCING

(71) Applicant: The Nielsen Company (US), LLC, New York, NY (US)

(72) Inventors: Yue Xiao, Palatine, IL (US); Kyle A. Gerhart, Chicago, IL (US)

(73) Assignee: NIELSEN CONSUMER LLC, New York, NY (US)

( * ) Notice: Subject to any disclaimer, the term of this patent is extended or adjusted under 35 U.S.C. 154(b) by 467 days.

(21) Appl. No.: 15/887,725

(22) Filed: Feb. 2, 2018

(65) Prior Publication Data

US 2018/0260826 A1  Sep. 13, 2018

Related U.S. Application Data

(63) Continuation of application No. 13/600,778, filed on Aug. 31, 2012, now abandoned.

(51) Int. Cl.
*G06Q 30/02* (2012.01)
*G06Q 10/04* (2012.01)

(52) U.S. Cl.
CPC ..... *G06Q 30/0201* (2013.01); *G06Q 30/0202* (2013.01); *G06Q 10/04* (2013.01)

(58) Field of Classification Search
None
See application file for complete search history.

(56) References Cited

U.S. PATENT DOCUMENTS

| | | | |
|---|---|---|---|
| 5,461,699 A | 10/1995 | Arbabi et al. | |
| 5,615,109 A | 3/1997 | Eder | |
| 6,804,657 B1 | 10/2004 | Sultan | |
| 7,080,026 B2 | 7/2006 | Singh et al. | |
| 7,680,685 B2 | 3/2010 | Ouimet et al. | |
| 7,797,182 B2 | 9/2010 | Lindquist et al. | |
| 8,131,850 B2 | 3/2012 | Kuo et al. | |
| 2008/0154693 A1 | 6/2008 | Bateni et al. | |
| 2009/0216611 A1 | 8/2009 | Leonard et al. | |

(Continued)

OTHER PUBLICATIONS

Ching-Chin, "Designing a decision-support system for new product sales forecasting," 2010, Expert Systems with Applications, vol. 37, pp. 1654-1665 (Year: 2010).*

(Continued)

*Primary Examiner* — Ivan R Goldberg
(74) *Attorney, Agent, or Firm* — Hanley, Flight & Zimmerman, LLC

(57) ABSTRACT

Methods and apparatus are disclosed to forecast new product launch sourcing. An example method includes identifying shared attributes between the new product and a plurality of existing products in the target market, calculating theoretical co-penetration values between the attributes shared between the new product and at least one of the plurality of existing products, calculating actual co-penetration values between the attributes shared between the new product and at least one of the plurality of existing products, calculating an attribute distance value between corresponding ones of the theoretical and actual co-penetration values, and calculating a percent volume of the new product expected to be sourced from one of the plurality of existing products based on the attribute distance value.

15 Claims, 6 Drawing Sheets

(56) References Cited

U.S. PATENT DOCUMENTS

| | | | |
|---|---|---|---|
| 2010/0121671 A1 | 5/2010 | Boutilier et al. |
| 2010/0169162 A1 | 6/2010 | Anderson et al. |
| 2010/0228604 A1 | 9/2010 | Desai et al. |
| 2011/0071874 A1 | 3/2011 | Schneersohn et al. |
| 2011/0196715 A1 | 8/2011 | Matkowsky |
| 2011/0276364 A1 | 11/2011 | Bergstrom et al. |
| 2014/0067466 A1 | 3/2014 | Xiao et al. |

OTHER PUBLICATIONS

Ehrenberg et al., "Understanding Brand Performance Measures: Using Dirichlet Benchmarks," Journal of Business Research, vol. 57, 2004, pp. 1307-1325, 19 pages.

Leeflang et al., "Building Models for Marketing Decisions," Springer Science + Business Media, 2002, pp. 192-235, 482-521, 86 pages.

Bassi, "The Dirichlet Model: Analysis of a Market and Comparison of Estimation Procedures," Marketing Bulletin, vol. 22, Technical Note 1, 2011, 11 pages.

Bhattacharya, "Is your brand's loyalty too much, too little, or just right?: Explaining deviations in loyalty from the Dirichlet norm," International Journal of Research in Marketing, vol. 14, 1997, pp. 421-435, 15 pages.

Cohen, "Differentiated Product demand analysis with a structured covariance probit: A Bayesian econometric approach," PhD dissertation, University of Connecticut, 2009, 184 pages.

Nikolaeva et al., "The Moderating Role of Consumer and Product Characteristics on the Value of Customized On-Line Recommendations," International Journal of Electronic Commerce, vol. 11, No. 2, 2006, pp. 101-123, 24 pages.

Ehrenberg, "New Brands and the Existing Market," International Journal of Market Research, vol. 33, No. 4, 1991, 10 pages.

Foxall, "The Substitutability of Brands," Managerial and Decision Economics, vol. 20, 1999, pp. 241-257, 17 pages.

Pammer, "Forecasting the Penetration of a New Product—A Bayesian Approach," Journal of Business & Economic Statistics, vol. 18, No. 4, 2000, pp. 428-435, 8 pages.

Rungie et al., "Calculation of Theoretical Brand Performance Measures from the Parameters of the Dirichlet Model," Marketing Bulletin, Massey University, 15, Technical Note 2, 2004, 19 pages.

Uncles, "Patterns of Buyer Behavior: Regularities, Models, and Extensions," 1995, Marketing Science, vol. 14, No. 3, 1995, pp. G71-G78, 9 pages.

Ehrenberg, Andrew, "Repeat Buying," Journal of Empirical Generalizations in Marketing Science, 2000, vol. 5, No. 2, 370 pages.

Goodhardt et al., "The Dirichlet: A Comprehensive Model of Buying Behaviour," vol. 147, Part 5, J.R. Statist. Soc. A,1984, 36 pages.

Lomax et al., "The Measurement of Cannibalization," Journal of Product & Brand Management, vol. 6, No. 1, 1997, 13 pages.

Chen, "The Dirichlet Package," Feb. 8, 2009, 14 pages.

United States Patent and Trademark Office, "Examiner's Answer to Appeal Brief," issued in connection with U.S. Appl. No. 13/600,778, dated Oct. 16, 2015, 21 pages.

United States Patent and Trademark Office, "Advisory Action," issued in connection with U.S. Appl. No. 13/600,778, dated Jul. 1, 2015, 3 pages.

United States Patent and Trademark Office, "Final Office Action," issued in connection with U.S. Appl. No. 13/600,778, dated Jan. 23, 2015, 40 pages.

United States Patent and Trademark Office, "Non-final Office Action," issued in connection with U.S. Appl. No. 13/600,778, dated Jun. 26, 2014, 31 pages.

* cited by examiner

| | BABY | BASE | COLD | COLOR | DELIC | HYPO | ODOR | PURE | SCENT | SOFT | STAIN |
|---|---|---|---|---|---|---|---|---|---|---|---|
| BABY | 1.62% | 0.10% | 0.72% | 0.10% | 0.53% | 0.22% | 0.12% | 0.14% | 0.42% | 0.46% | |
| BASE | | 2.67% | 26.06% | 1.90% | 10.39% | 7.04% | 3.30% | 3.96% | 12.02% | 14.96% | |
| COLD | | | 1.43% | 0.09% | 0.53% | 0.73% | 0.32% | 0.30% | 0.86% | 0.78% | |
| COLOR | | | | 1.01% | 4.24% | 3.68% | 1.74% | 1.93% | 6.45% | 7.60% | |
| DELIC | | | | | 0.46% | 0.26% | 0.14% | 0.17% | 0.44% | 0.55% | |
| HYPO | | | | | | 1.16% | 0.90% | 0.66% | 1.96% | 3.84% | |
| ODOR | | | | | | | 0.83% | 1.00% | 3.03% | 2.21% | |
| PURE | | | | | | | | 0.62% | 1.15% | 1.19% | |
| SCENT | | | | | | | | | 1.59% | 1.33% | |
| SOFT | | | | | | | | | | 3.83% | |
| STAIN | | | | | | | | | | | |

FIG. 3

METHODS AND APPARATUS TO FORECAST NEW PRODUCT LAUNCH SOURCING

CROSS-REFERENCE TO RELATED APPLICATIONS

This patent arises from a continuation of U.S. patent application Ser. No. 13/600,778, which is entitled "METHODS AND APPARATUS TO FORECAST NEW PRODUCT LAUNCH SOURCING", and which was filed on Aug. 31, 2012, the contents of which are expressly incorporated by reference herein in their entireties for all purposes.

FIELD OF THE DISCLOSURE

This disclosure relates generally to market research, and, more particularly, to methods and apparatus to forecast new product launch sourcing.

BACKGROUND

In recent years, market researchers have strived to predict the success of products introduced into one or more markets. Market researchers expect that new products that are introduced into a market will source from other products that already reside in the market. In some circumstances, new products may source from existing products of the same manufacturer, which may result in undesirable cannibalization.

BRIEF DESCRIPTION OF THE DRAWINGS

FIG. 3 is an example actual co-penetration matrix generated by the example system of FIG. 1.

DETAILED DESCRIPTION

Figure 1:
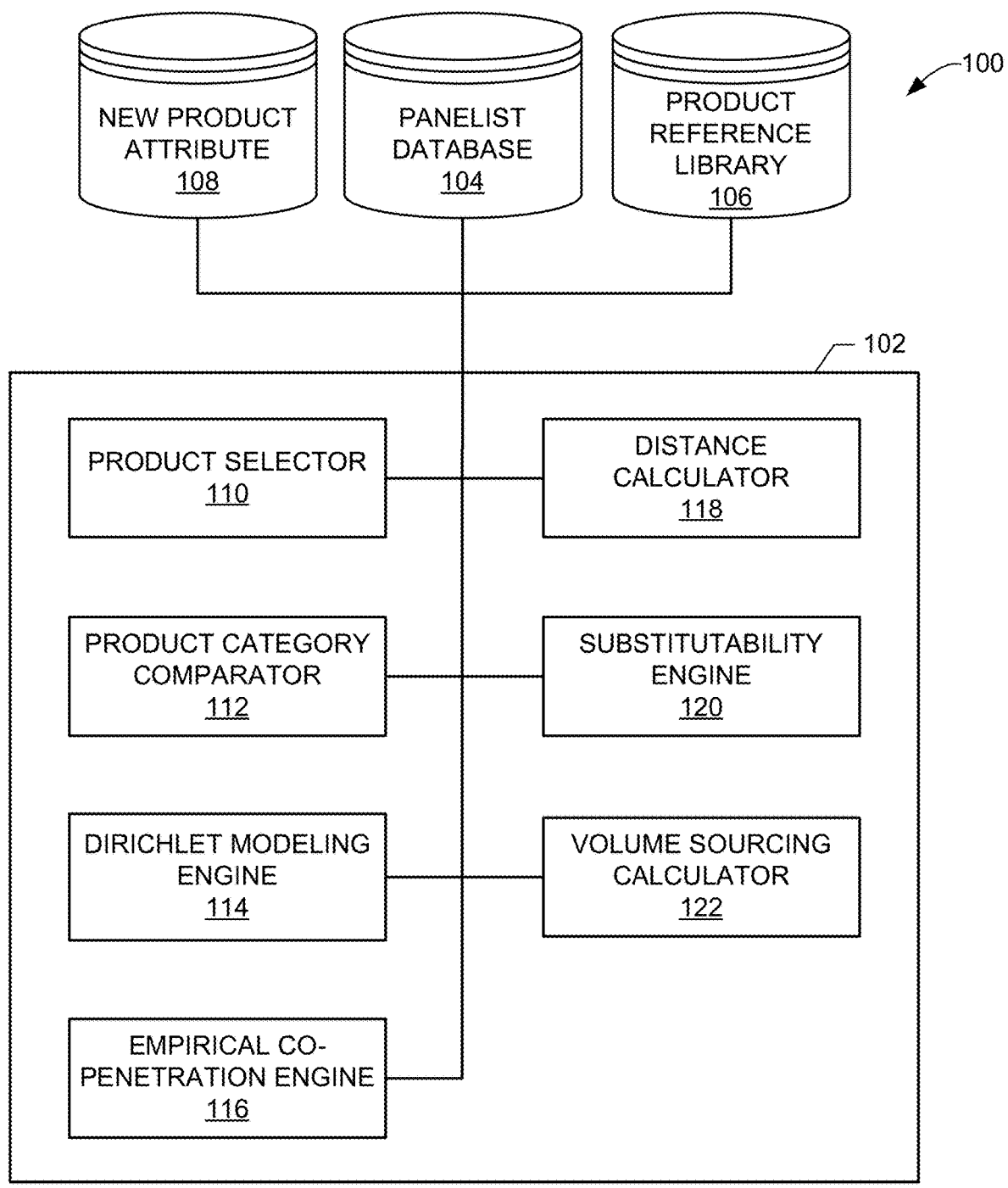
FIG. 1 is a schematic illustration of a system to forecast new product launch sourcing in accordance with the teachings of this disclosure.

Market researchers seek to gain competitive advantage by bringing new products to a market. When bringing a product into the market, a portion of the volume of the new product is expected to source from (e.g., replace sales of) other products that already participate in that market. However, when the newly introduced product diverts sales from another product also produced and/or otherwise manufactured by the same manufacturer and/or supplier, some of the net competitive advantage realized by introduction of the new product is lost. This loss of sales is sometimes referred to as cannibalization because a manufacturer's own product is "consuming" (e.g., replacing) sales of another product of that same manufacturer.

Market researchers typically expect some degree of cannibalization to occur when introducing a product (e.g., a new product having some similarities to existing competitive products, an existing product introduced to a particular market geography for the first time, etc.). However, methods, apparatus, systems and/or articles of manufacture disclosed herein identify consumers that will likely participate in such cannibalization by buying a new product in the market. As such, the market researchers may realize and/or otherwise appreciate whether the introduced product steals its own buyers (e.g., from its own products) from other products in the manufacturer's portfolio, or whether the introduced product steals buyers from competing manufacturers as hoped.

Typical estimations of sourcing behavior rely on fair share sourcing estimates that expect a newly introduced product to source from other products in a manner that is directly proportional to existing competitive product shares in the market. For example, in the context of automobile sales in the United States, Ford® has the highest share of automobile sales at the time of this writing. Fair share sourcing logic for a current Mercedes Benz® owner would identify that the next car to be purchased by that consumer would most likely be a Ford® automobile because Ford® is the automobile company having the largest market share of automobile sales. Market researchers familiar with typical purchasing behavior of current Mercedes Benz® owners would identify that such fair share sourcing logic is not an accurate representation of expected future behavior. In other words, for some product types and/or categories, reliance upon fair share sourcing logic yields estimates that are too generalized for practical use for market researchers. Accordingly, example methods, apparatus, systems and/or articles of manufacture disclosed herein deviate from the generalized errors associated with fair share sourcing by, in part, focusing on cross purchasing within attributes. Attributes may include, but are not limited to brands (e.g., attribute levels of Coke® vs. Pepsi®), flavors (e.g., attribute levels of cherry vs. lime), size, feature (e.g., attribute levels of powder, liquid, etc.), and diet classifications (e.g., attribute levels of diet soda vs. regular soda).

Products of interest to a market researcher may have any number of associated attributes. Each such attribute may include any number of mutually exclusive attribute levels, and every product will be mapped to only one attribute level within a corresponding attribute. For example, every product typically has an associated brand (e.g., an attribute). Example attribute levels of the brand attribute include, for a soft drink product, a name brand such as Coke®, Pepsi®, Sprite®, Dr. Pepper®, etc. In the event the product of interest is a 12-oz aluminum can of Coke®, then the attribute level is Coke®, which is mutually exclusive to all other attribute levels in the brand attribute. For example, a Coke® product cannot also be a Sprite® or Dr. Pepper® product. Continuing with the example product of interest of a 12-oz aluminum can of Coke®, a container attribute would have an attribute level of aluminum can. Other attribute levels for the container attribute may contain, but are not limited to plastic bottle, glass bottle, etc.

Dirichlet theory utilizes and improves upon pure fair share sourcing logic to generate theoreticals (estimate values, parameters) indicative of where an introduced product will source, as described by Goodhardt, Ehrenberg, and Chatfield (see "The Dirichlet: A Comprehensive Model of Buying Behavior," Journal of the Royal Statistical Society, Series A, Number 147, pp. 621-55, 1984), which is hereby incorporated by reference in its entirety. When provided with consumer purchase summary data (e.g., Nielsen® panelist data, Nielsen® Homescan® data, etc.), the Dirichlet model estimates parameters indicative of the consumer repeat buying behavior (e.g., such as loyalty and/or purchase frequency). Additionally, estimation of the Dirichlet model yields probability functions to facilitate calculation of theoretical co-penetration. Co-penetration refers to a percentage of a population that purchases a pair of products during a time period of interest. When considering a product for introduction into an existing market (e.g., a line extension of an existing product), example methods, apparatus, systems and/or articles of manufacture disclosed herein apply a Dirichlet analysis for each major (e.g., statistically relevant, as deemed by businesses, etc.) attribute to estimate Dirichlet parameters (Dirichlet S parameters) and parameters that conform to a negative binomial distribution (NBD) (NBD-k, NBD-a). These parameters may indicate how each attribute level polarizes a category, and they may be used to calculate a theoretical cross purchase pattern (e.g., switching patterns) between pairs of attribute levels. Switching patterns (e.g., cross purchasing patterns) between pairs of attribute levels may quantify to what degree each attribute and/or attribute level (e.g., liquid detergent attribute level, powder detergent attribute level, color safe attribute level, hypoallergenic attribute level, etc.) polarizes a product category (e.g., soft drinks, laundry detergent, etc.).

Average polarization of levels within an attribute provides an indication of the polarization of the corresponding attribute. Some attributes and/or attribute levels are associated with differing degrees of polarization. For example, attribute levels associated with brand typically exhibit stronger polarization behaviors as compared with attribute levels related to container (e.g., the choice between Coke® and Pepsi® (brand) is much more polarizing than the choice between cans and bottles (container)). In the event an attribute polarizes consumer behavior to a relatively high degree (e.g., relatively high when compared to other attribute parameters, as shown below), then switching (e.g., co-purchasing) among different levels of the attribute will be relatively low. The level of polarization for each attribute may be identified by the Dirichlet S parameter. A relatively small Dirichlet S parameter value is indicative of high polarization (e.g., low switching tendency), while a relatively large Dirichlet S parameter is indicative of low polarization (e.g., high switching tendency). A theoretical co-penetration of product attributes may be calculated in a manner consistent with example Equation 1.

$$P_{i \cap j} = P_i + P_j - P_{i \cup j}$$ Equation 1.

In example Equation 1, $P_{i \cap j}$ reflects a theoretical co-penetration of product attribute level pair i and j, $P_i$ reflects a theoretical penetration of product attribute level i, $P_j$ reflects a theoretical penetration of product attribute level j, and $P_{i \cup j}$ reflects a theoretical penetration of product attribute level i or product attribute level j. Each penetration value in example Equation 1 is derived from corresponding NBD distributions. While the Dirichlet model calculates and/or otherwise exposes theoretical co-penetration values between one or more pairs of attribute levels of interest, actual co-penetration purchase behavior may deviate from theoretical calculations. In some circumstances, the underlying reliance upon fair share sourcing techniques employed by the Dirichlet model causes deviation from empirical observations. Such deviations may be more pronounced and/or otherwise significant in view of particular brands, markets and/or product types. To determine a degree of substitutability between product attributes in a more reliable and/or industry-expected manner than is otherwise generated by the Dirichlet model, example methods, apparatus, systems and/or articles of manufacture disclosed herein ground the theoretical co-penetration values with empirical values. The gap between theoretical and empirical co-penetration may be leveraged to forecast sourcing of new product launches.

FIG. 1 is a schematic illustration of an example system 100 to forecast new product launch sourcing. In the illustrated example of FIG. 1, the system includes a product sourcing engine 102 communicatively connected to a panelist database 104, a product reference library (PRL) 106 and a new product attribute database 108. The example product sourcing engine 102 also includes a product selector 110, a product category comparator 112, a Dirichlet modeling engine 114, an empirical co-penetration engine 116, a distance calculator 118, a substitutability engine 120 and a volume sourcing calculator 122.

In operation, the example product sourcing engine 102 invokes the example product selector 110 to identify a product of interest that is to be considered for entry into a target market in which it has not previously participated. As used herein, a "product of interest" or a "new product" refers to a new combination of previously existing attribute levels, which may be related to one or more products that have no market presence in a market of interest (but may have a market presence in a separate market from the target market location of interest). In some examples, the example new products may be line extensions of already existing products, which have a degree of attribute similarity to one or more products that already participate in the example target market. As discussed above, the degree of similarity between such products (e.g., in view of attribute levels and the interaction therebetween) may determine where the new product will source in the target market. In the event the new product sources from other products in the target market that are also provided by the same manufacturer/supplier, (i.e., cannibalization effects) the manufacturer/supplier may not realize a net economic benefit in the target market.

The example product category comparator 112 automatically identifies existing products in the target market of interest that are in a similar or same category as the new product. This identification is qualified by comparing information characterizing the new product (e.g., attributes) to information characterizing existing products (e.g., attributes). Information related to the new product of interest may be stored in the example new product attribute database 108 and/or the example PRL database 106. The example PRL database 106 may include, but is not limited to the Nielsen® TDLinx® database and/or the Nielsen® PRL® that includes product specific attribute information such as, but not limited to product name, manufacturer name, brand, packaging type, product size, flavor, lot number, serial number, nutritional information, features and/or corresponding universal product codes (UPCs). The Nielsen® PRL® presently codes more than 700,000 items, in which each item includes an average of forty (40) descriptive characteristics/attributes/attribute levels.

For example, if the new product is a baby diaper brand, then the example product category comparator 112 identifies one or more products from the PRL database 106 having the same/similar category of "baby products," and/or "diapers." Additionally, the example product category comparator 112 identifies one or more subgroups of products associated with the category that may be a closer match when considering target market performance, such as "baby diapers" rather than "adult diapers." In other examples, a new laundry detergent product may reside in a "laundry detergent" category (e.g., a highest level attribute), and the example product category comparator 112 may further tailor a subgroup of candidate products with which to compare by identifying an attribute level of "liquid detergents" versus "powder detergents," depending on the type of new product form. Depending on the new product of interest to be considered for a target market, the example product category comparator 112 may identify any number of attribute levels for use in identifying candidate comparative products that currently participate in the target market.

The example product category comparator 112 obtains available purchase frequency data and/or other target market data associated with the identified currently available comparative products from the example panelist database 104. The example panelist database 104 may include, but is not limited to the Nielsen® Homescan® database and/or point-of-sale (POS) data from retailers and/or merchants. The example Dirichlet modeling engine 114 estimates Dirichlet parameters (Dirichlet S parameters) for the attribute levels of products identified by the example product category comparator 112, and calculates theoretical co-penetration values in a manner consistent with example Equation 1 above. As discussed above, while the Dirichlet analysis provides an indication of co-penetration between products and/or between attributes levels of products, the Dirichlet analysis may not accurately fit marketing expectations for one or more product types and/or product categories.

To improve the application of Dirichlet techniques, the example empirical co-penetration engine 116 of FIG. 1 retrieves product market activity data from the panelist database 104 to calculate an actual co-penetration without Dirichlet techniques. In particular, if the actual co-penetration between attributes/attribute levels deviates from theoretical predictions based on fair share sourcing influences associated with Dirichlet techniques, then attribute interaction effects may be observed. The degree of such interaction effects may depend upon a direction and/or magnitude of the deviation, which is indicated by a distance value. The example distance calculator 118 calculates the distance value between the theoretical values and the empirical values to determine a degree of substitutability. Generally speaking, the closer two attribute levels are to each other, such attribute levels are deemed to be more substitutable to each other. The example substitutability engine 120 calculates a substitutability index between the new and existing products based on the distance values between attribute levels to generate a weighted average of distances between a new product for the target market and existing products. The example volume sourcing calculator 122 determines volume sourcing value(s) for the new product based on the substitutability index, as described in further detail below, which provides information indicative of where sourcing may occur in the target market.

Figure 2:
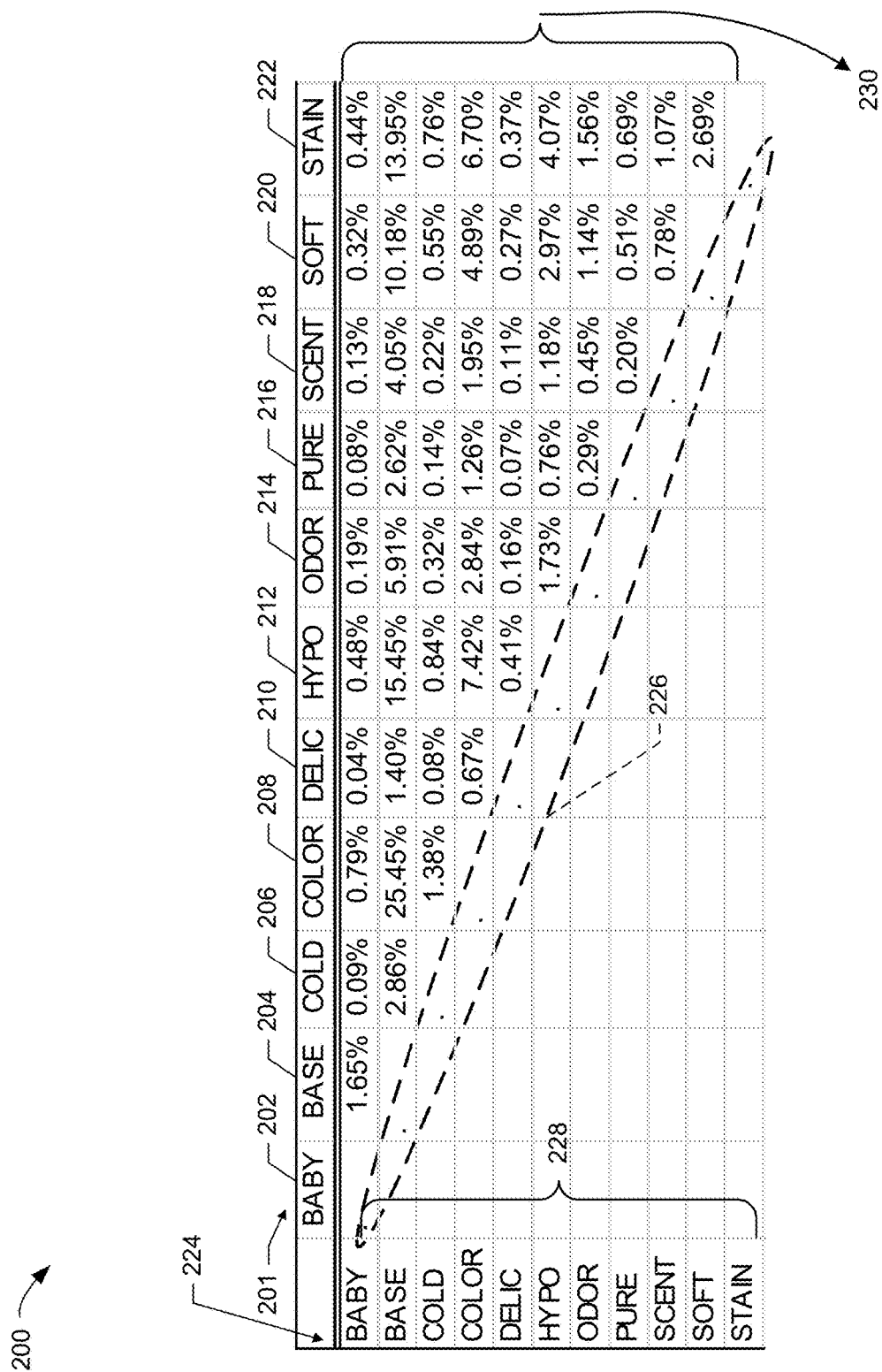
FIG. 2 is an example theoretical co-penetration matrix generated by the example system of FIG. 1.

In the illustrated example of FIG. 2, a theoretical co-penetration matrix 200 between different laundry detergent attribute levels is shown. The example matrix 200 includes a row 201 having an example baby attribute level 202, an example base attribute level 204, an example cold attribute level 206, an example color attribute level 208, an example delicate (DELIC) attribute level 210, an example hypoallergenic (HYPO) attribute level 212, an example odor attribute level 214, an example pure attribute level 216, an example scent attribute level 218, an example softening (SOFT) attribute level 220 and an example stain attribute level 222. The example matrix 200 also includes a column 224 including the same example attribute levels (202-222) residing in the example row 201 to facilitate comparisons between the different attribute levels, in which a zero cross-matrix diagonal 226 is populated with zero as a reflection of attribute levels compared against themselves. A lower half 228 of the example matrix 200 is not populated in the illustrated example of FIG. 2 because it is a symmetric matrix. The values in the illustrated matrix 200 of FIG. 2 indicate a theoretical degree of co-penetration (e.g., based on the Dirichlet model) indicative of a percentage of a household in a selected population that purchased both a product having the row 201 attribute level and a product having the column 224 attribute level.

In the illustrated example of FIG. 3, an empirical co-penetration matrix 300 between the different laundry detergent attribute levels of FIG. 2 is shown. The example empirical matrix 300 of FIG. 3 includes similarly numbered elements as is shown in FIG. 2, but with a three-hundred series prefix.

Generally speaking, the example empirical matrix 300 of FIG. 3 includes co-penetration values that differ from the example theoretical co-penetration values of the matrix 200 of FIG. 2. Differences between theoretical co-penetration and empirical co-penetration illustrate details of how different attribute levels may interact. The deviation between the actual co-penetration values and the theoretical co-penetration values are characterized by a distance in a manner consistent with example Equation 2.

$$D(A_i, A_j) = \frac{C_T(A_i, A_j)}{C_A(A_i, A_j)}. \qquad \text{Equation 2}$$

In example Equation 2, $D(A_i, A_j)$ represents an attribute A having $i^{th}$ and $j^{th}$ levels and their relative distances therebetween, $C_T(A_i, A_j)$ represents the attribute A in view of its theoretical co-penetration between the $i_{th}$ and $j_{th}$ level, and $C_A(A_i, A_j)$ represents the attribute A in view of its actual co-penetration between the $i_{th}$ and $j_{th}$ level. The lower the distance, the higher the degree of interaction. The example diagonal may be assumed to have a distance of zero (0) because corresponding attribute levels of such pairs are the same. As described above, levels of an attribute may refer to descriptive sub-categories related to a higher level attribute type. For example, a laundry product may have major attributes of segment and benefit. A segment attribute may have levels of liquid and powder, while a benefit attribute may have levels of baby (e.g., to represent baby-safe or gentle washing), base, cold (e.g., to represent cleaning capabilities at relatively colder water temperatures), color (e.g., to represent color safe washing protection), delicate (e.g., to represent fabric safe washing capabilities) and odor (e.g., to represent an ability to remove strong odors). Attribute levels of an attribute are mutually exclusive and do not intersect in view of a particular product. For example, a liquid laundry detergent cannot also be a powder detergent at the same time and, as such, will not include intersecting data points on one or more theoretical and/or empirical matrices.

Figure 4:
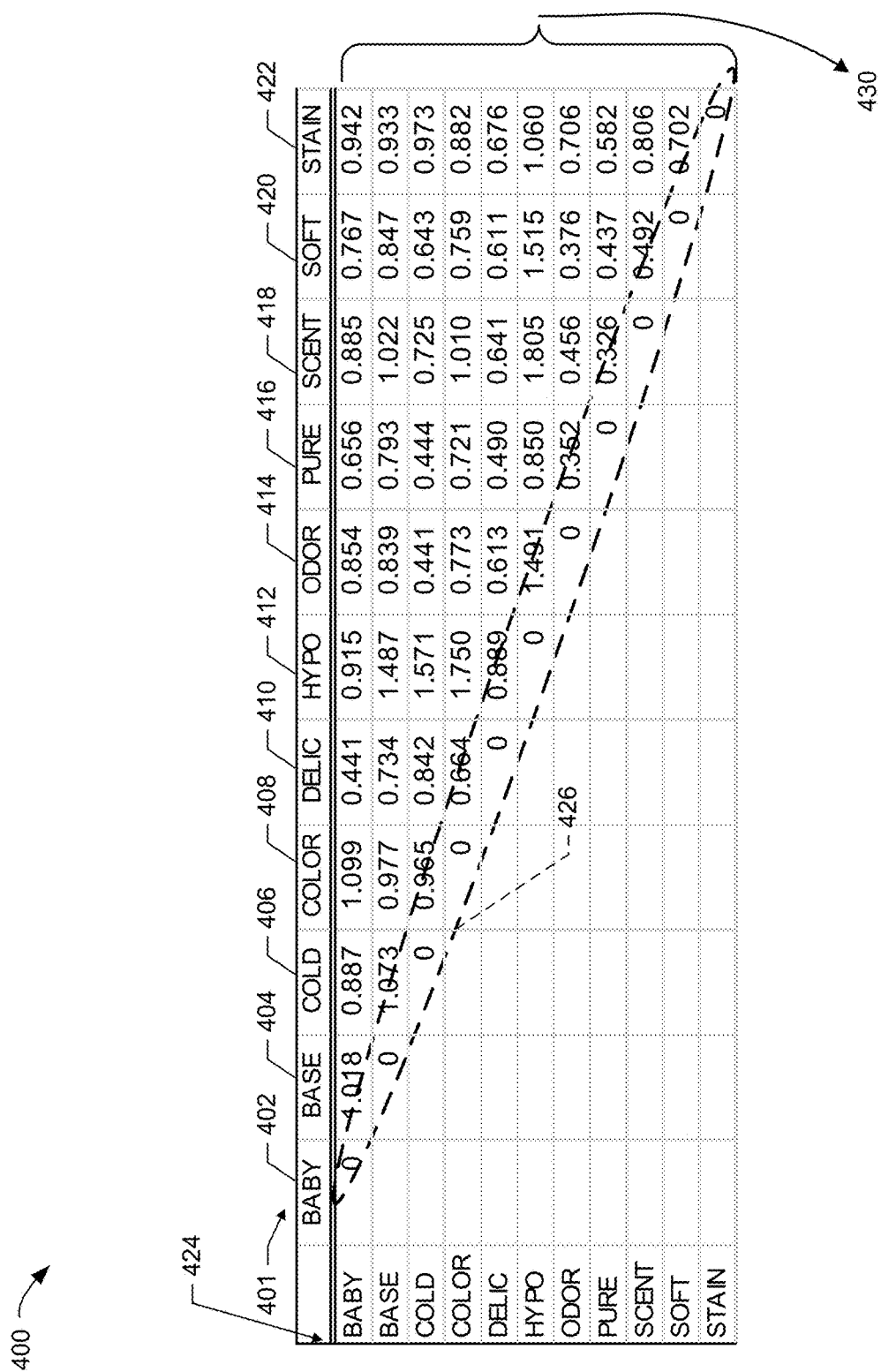
FIG. 4 is an example distance matrix generated by the example system of FIG. 1.

In the illustrated example of FIG. 4, a distance matrix 400 is shown to reflect relative attribute level differences between the theoretical co-penetration values of FIG. 2 and the actual co-penetration values of FIG. 3. The example distance matrix 400 of FIG. 4 includes similarly numbered elements as is shown in FIGS. 2 and 3, but with a four-hundred series prefix. In the event a first attribute level pair exhibits a relatively lower distance value than a second attribute level pair, then the first attribute level pair is deemed to be more substitutable. In other words, if a new product to be introduced into the market is more likely to cannibalize from other market products having those attribute levels that are closer to those of the new product. In the illustrated example of FIG. 4, the relative distance between attribute levels of "color" and "delic" (e.g., delicates) is 0.664 and the relative distance between attribute levels "color" and "hypo" is 1.750, which indicates that products having the attribute type "color" could be more easily substituted by "delic" than by "hypo."

Generally speaking, because different products in a market include any number of different attributes and/or attribute levels, calculating and/or otherwise determining a relative distance between theoretical Dirichlet co-penetration values and empirical co-penetration values illustrates a degree of substitutability based on the distances between attribute levels within a set of attributes. In the event similar attributes and/or attribute levels are found in a product to compete with a newly introduced product, then sourcing is likely to occur therebetween. Further, in the event that a market researcher can identify that a degree of sourcing will likely occur from an already existing market product by the same manufacturer as a candidate new product, then the market researcher can recommend alternate markets to avoid undesirable cannibalization effects.

While the example distance matrix 400 of FIG. 4 represents relative distances between attribute levels of the "benefit" attribute, one or more products of interest may have any number of additional and/or alternate attributes. As such, example methods, systems, apparatus and/or articles of manufacture disclosed herein generate any number of distance matrices in view of any number of candidate attributes of interest because a product of interest (e.g., a candidate laundry product) in a category of interest (e.g., laundry detergents) includes any number of combinations of different attributes and/or attribute levels. In view of the differing number of attributes and/or attribute levels for each candidate product of interest, a substitutability index value is calculated between two products of interest to leverage (a) the distances between attribute levels of the two products within an attribute and (b) a degree of polarization of the relevant attributes. In other words, a substitutability index is calculated for each existing product in the market as the weighted average, by attribute polarization of all distances between the candidate product and the existing product across all attributes. As described above, a level of polarization is derived from an inverse of the Dirichlet S parameter for an attribute. If an attribute highly polarizes consumer behavior, then switching among different levels of the attribute will be relatively low.

A substitutability index between two products of interest may be calculated in a manner consistent with example Equation 3.

$$SI(P_i, P_j) = \left[ \frac{\sum_{k=1}^{n} (DOP_{Ak} * D(A_{ki}, A_{kj}))}{\sum_{k=1}^{n} (DOP_{Ak})} \right]^{-1}. \quad \text{Equation 3}$$

In example Equation 3, $SI(P_i, P_j)$ represents the substitutability index between product i and product j, in which product i is indicative of a new product (e.g., a line product introduced into a new geographical market area) and product j is an existing product. $DOP_{Ak}$ represents a degree of polarization (e.g., an inverse of the Dirichlet S parameter) for attribute k, $D(A_{ki}, A_{kj})$ represents a distance between the attribute levels of product i and j for an attribute of interest k, and n represents a number of attributes of interest.

Example Equation 3 applies weights in view of a degree of polarization so that distances between attribute levels in attributes that are more polarizing than others count more to a consideration of the substitutability of products. To determine a percent of volume shifted from a specific product, example methods, apparatus, systems and/or articles of manufacture disclosed herein apply one or more substitutability indexes in a manner consistent with example Equation 4.

$$\text{Source}(P_i, P_j) = \frac{SI(P_i, P_j) * SOPO_j}{\sum_{k=1}^{n} (SI(P_i, P_k) * SOPO_k)}. \quad \text{Equation 4}$$

In example Equation 4, Source $(P_i, P_j)$ refers to a percent volume of product i that is sourced from product j, in which product i refers to the newly introduced product and product j refers to an existing product. $SI(P_i, P_j)$ refers to the substitutability index in a manner consistent with example Equation 3, $SOPO_k$ refers to a share of purchase occasions of product k, and n refers to a number of existing products.

While an example manner of implementing the system 100 to dynamically track consumer segments with point-of-sale data has been illustrated in FIGS. 1-4, one or more of the elements, processes and/or devices illustrated in FIGS. 1-4 may be combined, divided, re-arranged, omitted, eliminated and/or implemented in any other way. Further, the example product sourcing engine 102, the example panelist database 104, the example PRL database 106, the example new product attribute database 108, the example product selector 110, the example product category comparator 112, the example Dirichlet modeling engine 114, the example empirical co-penetration engine 116, the example distance calculator 118, the example substitutability engine 120, the example volume sourcing calculator 122, the example theoretical co-penetration matrix 200, the example empirical co-penetration matrix 300, and/or the example distance matrix 400 of FIGS. 1-4 may be implemented by hardware, software, firmware and/or any combination of hardware, software and/or firmware. Thus, for example, any of the example product sourcing engine 102, the example panelist database 104, the example PRL database 106, the example new product attribute database 108, the example product selector 110, the example product category comparator 112, the example Dirichlet modeling engine 114, the example empirical co-penetration engine 116, the example distance calculator 118, the example substitutability engine 120, the example volume sourcing calculator 122, the example theoretical co-penetration matrix 200, the example empirical co-penetration matrix 300, and/or the example distance matrix 400 of FIGS.1-4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example product sourcing engine 102, the example panelist database 104, the example PRL database 106, the example new product attribute database 108, the example product selector 110, the example product category comparator 112, the example Dirichlet modeling engine 114, the example empirical co-penetration engine 116, the example distance calculator 118, the example substitutability engine 120, the example volume sourcing calculator 122, the example theoretical co-penetration matrix 200, the example empirical co-penetration matrix 300, and/or the example distance matrix 400 of FIGS. 1-4 are hereby expressly defined to include a tangible computer readable storage medium such as a memory, DVD, CD, Blu-ray, etc. storing the software and/or firmware. Further still, the example system 100 of FIG. 1 may include one or more elements, processes and/or devices in addition to, or instead of, those illustrated in FIG. 1 and/or may include more than one of any or all of the illustrated elements, processes and devices.

Figure 5:
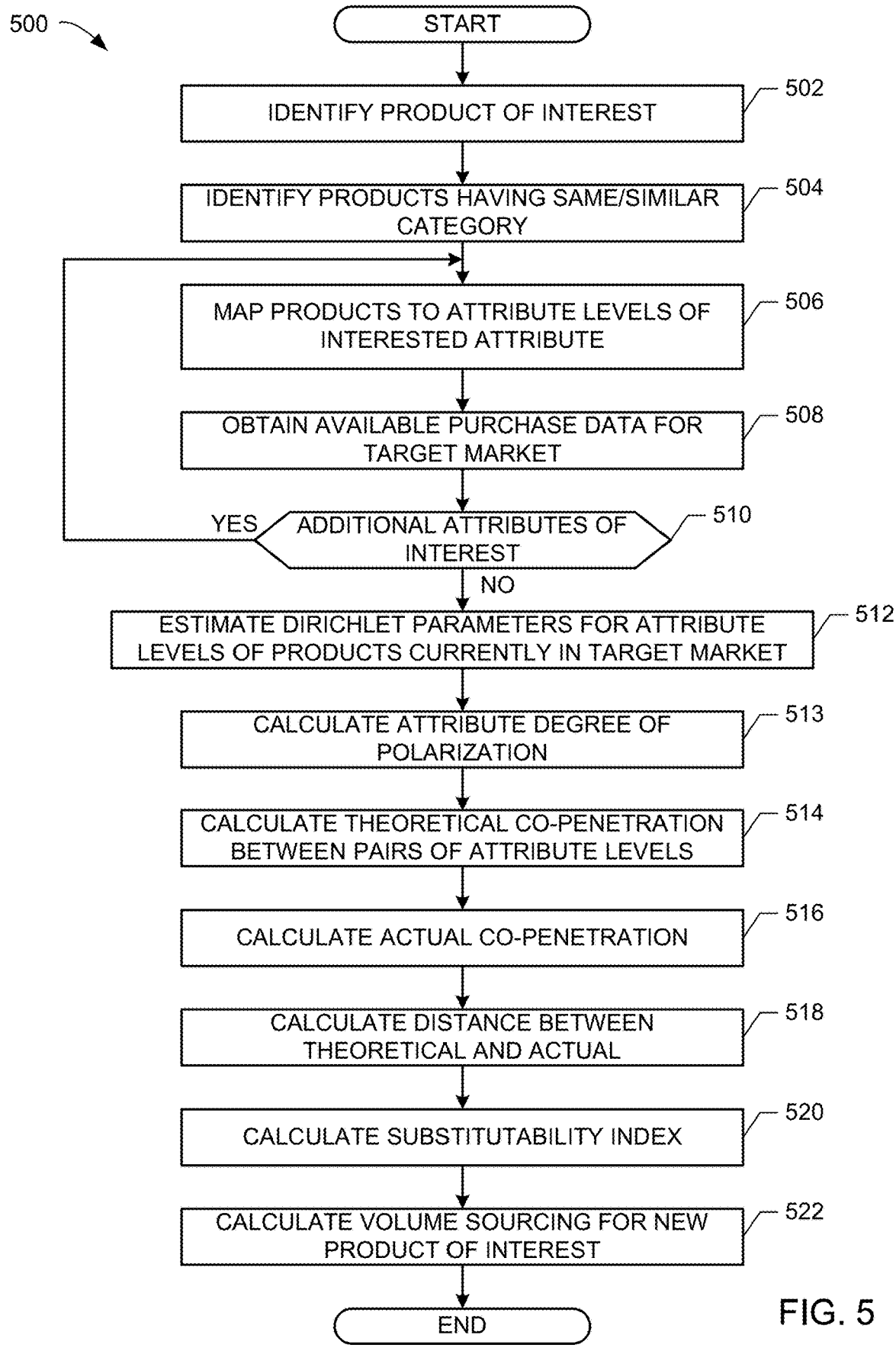
FIG. 5 is a flowchart representative of example machine readable instructions which may be executed to forecast new product launch sourcing.

Flowcharts representative of example machine readable instructions for implementing the system 100 of FIG. 1, the theoretical matrix 200 of FIG. 2, the empirical matrix 300 of FIG. 3 and/or the distance matrix 400 of FIG. 4 are shown in FIG. 5. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIG. 5, many other methods of implementing the example system 100 to forecast new product launch sourcing may alternatively be used. For example, the order of execution of the blocks may be changed, and/or some of the blocks described may be changed, eliminated, or combined.

As mentioned above, the example processes of FIG. 5 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disc and to exclude propagating signals. Additionally or alternatively, the example processes of FIG. 5 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage device and/or storage disc in which information is stored for any duration (e.g., for extended time periods, permanently, brief instances, for temporarily buffering, and/or for caching of the information). As used herein, the term non-transitory computer readable medium is expressly defined to include any type of computer readable storage device and/or storage disc and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The program 500 of FIG. 5 begins at block 502 where the example product selector 110 identifies a product of interest that is to be considered for entry into a target market in which it has not previously participated. To identify one or more existing products in the target market of interest that are in a similar or same category as the new product, the example product category comparator 112 identifies such similar products from the example PRL database 106 based on new product attribute levels stored in the example new product attribute database 108 (block 504). The example product category comparator 112 also identifies one or more subgroups of products associated with an attribute level of an attribute of interest within the category that may be a closer match when considering target market performance (block 506). As discussed above, a relatively high-level category related to a new baby diaper product may be "diapers." However, the "diapers" category may contain both "baby diapers" and "adult diapers," only one of which (the former) is a suitable category when comparing to a new category of a baby diaper product to be introduced into the target market. In some examples, products in the "baby diapers" sub-category may still be too generalized in the event the new baby diaper product of interest is associated with "newborns" versus "toddlers." Depending on the product type and/or number of sub-attributes within a category, the example product category comparator 112 identifies suitable products for comparison purposes.

The example product category comparator 112 obtains available purchase frequency data and/or other target market performance data associated with the identified currently available comparative products from the example panelist database 104 (block 508). In the event additional attributes and/or sub-attributes are associated with the category (block 510), control returns to block 506. Otherwise, the example Dirichlet modeling engine 114 estimates Dirichlet S parameters for attribute levels of products currently in the target market (block 512), calculates an attribute degree of polarization (block 513), and calculates theoretical co-penetration values between pairs of attribute levels (block 514), such as those shown in the example theoretical co-penetration matrix 200 of FIG. 2.

The example empirical co-penetration engine 116 retrieves product market activity data from the panelist database 104 to calculate an actual co-penetration without Dirichlet techniques (block 516), such as those shown in the example empirical co-penetration matrix 300 of FIG. 3. Using the theoretical co-penetration values (e.g., based on the Dirichlet calculations) and the actual co-penetration values, which are not based on Dirichlet calculations, the example distance calculator 118 calculates a distance value (block 518). As described above, the distance values expose a degree of substitutability between attributes and/or attribute levels that may indicate cannibalization could occur by introduction of the new product of interest in the target market. The example substitutability engine 120 calculates a substitutability index value for the new product and one of the products that already participate in the target market (block 520). The substitutability index may be calculated in a manner consistent with example Equation 3, and the example volume sourcing calculator 122 calculates a volume sourcing value for the new product based on the substitutability index and a share of purchase occasions (block 522). The volume sourcing value may be calculated by the example sourcing calculator 122 in a manner consistent with example Equation 4 to reveal a percent volume of the new product that is sourced from an already existing product in the target market.

Figure 6:
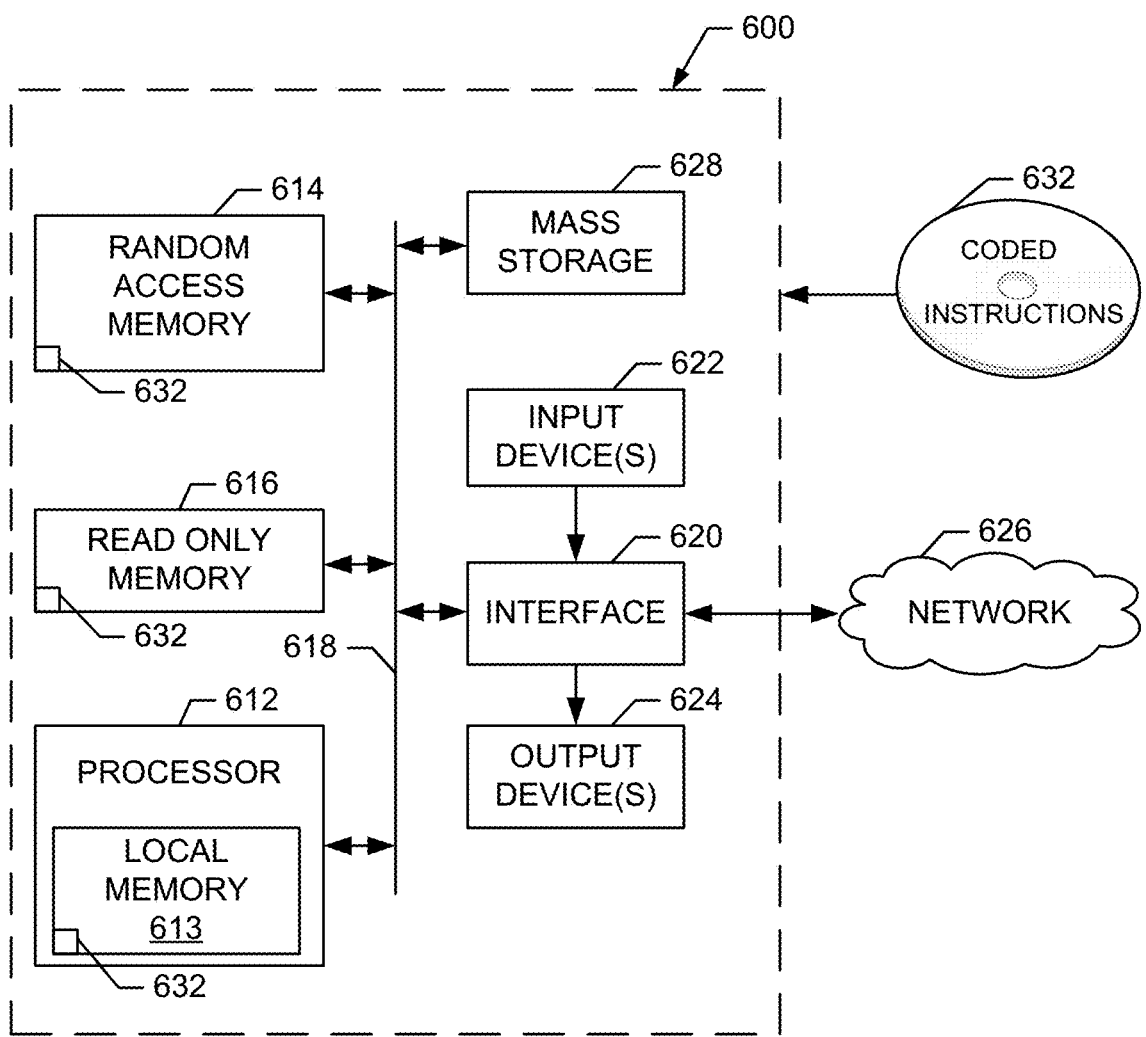
FIG. 6 is a schematic illustration of an example processor platform that may execute the instructions of FIG. 5 to implement the example systems and apparatus of FIGS. 1-4.

FIG. 6 is a block diagram of an example processor platform 600 capable of executing the instructions of FIG. 5 to implement the system 100 of FIG. 1, the theoretical co-penetration matrix 200 of FIG. 2, the actual co-penetration matrix 300 of FIG. 3 and/or the distance matrix 400 of FIG. 4. The processor platform 600 can be, for example, a server, a personal computer, an Internet appliance, or any other type of computing device.

The system 600 of the instant example includes a processor 612. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.).

The processor platform 600 also includes one or more mass storage devices 628 for storing software and data. Examples of such mass storage devices 628 include floppy disk drives, hard drive disks, compact disk drives and digital versatile disk (DVD) drives.

The coded instructions 632 of FIG. 5 may be stored in the mass storage device 628, in the volatile memory 614, in the non-volatile memory 616, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to reduce volume calculation error, the apparatus comprising:
    at least one processor;
    a product category comparator, implemented by the at least one processor to execute instructions thereon, to:
        access, via a network, first attributes associated with a new product in a new product attribute database;
        access, via the network, second attributes from existing products in a product reference library database, the existing products identified based on attribute levels associated with the first attributes; and
        identify attributes shared between the new product and the existing products in a target market based on a degree of similarly between the first attributes and the second attributes;
    a Dirichlet modeling engine, implemented by the at least one processor to execute instructions thereon, to generate a theoretical co-penetration matrix, the theoretical co-penetration matrix including theoretical co-penetration values between the attributes shared between the new product and at least one of the existing products;
    an empirical co-penetration engine, implemented by the at least one processor to execute instructions thereon, to:
        access, via the network, product market activity data from a panelist database including purchase data from merchants; and
        generate an empirical co-penetration matrix based on the product market activity data, the empirical co-penetration matrix including actual co-penetration values between the attributes shared between the new product and at least one of the existing products;
    a distance calculator, implemented by the at least one processor to execute instructions thereon, to reduce a model-based fair share sourcing error of the Dirichlet modeling engine by calculating attribute distance values based on a ratio of corresponding pairs of the theoretical and actual co-penetration values of the theoretical and empirical co-matrices, respectively, to generate a distance matrix; and
    a volume sourcing calculator, implemented by the at least one processor to execute instructions thereon, to:
        calculate a percent volume of the new product expected to be sourced from one of the existing products based on the attribute distance values of the distance matrix,
        generate a forecast corresponding to sourcing the new product based on the percent volume, and
        cause sourcing of the new product based on the forecast.

2. The apparatus as defined in claim 1, further including a substitutability engine, implemented by the at least one processor to execute instructions thereon, to calculate a substitutability index between the new product and the one of the existing products based on the attribute distance values.

3. The apparatus as defined in claim 2, wherein the substitutability engine is to calculate the substitutability index based on a degree of polarization associated with at least one of the attributes shared between the new product and existing products in the target market.

4. The apparatus as defined in claim 3, wherein the substitutability engine is to weight the degree of polarization by the attribute distance values.

5. The apparatus as defined in claim 3, wherein the degree of polarization includes an inverse Dirichlet parameter associated with the theoretical co-penetration values.

6. The apparatus as defined in claim 1, wherein the Dirichlet modeling engine is to estimate a Dirichlet model associated with attributes of the existing products in the target market.

7. The apparatus as defined in claim 1, wherein the attributes shared between the new product and existing products in the target market are associated with a product category.

8. The apparatus as defined in claim 1, wherein the attributes shared between the new product and existing products in the target market include at least one of a brand, a product type, a size, a feature or a flavor.

9. The apparatus as defined in claim 1, wherein the volume sourcing calculator is to output data pertaining to cannibalization effects between the new product and the at least one of the existing products.

10. The apparatus as defined in claim 9, wherein the volume sourcing calculator is to output data pertaining to alternative markets based on the cannibalization effects.

11. The apparatus as defined in claim 2, wherein the volume sourcing calculator is to cause substitution of at least one of the new product or the one of the existing products based on the substitutability index.

12. A tangible machine-readable storage device or storage disk comprising instructions that, when executed, cause a processor to, at least:

- access, via a network, first attributes associated with a new product in a new product attribute database;
- access, via the network, second attributes from existing products in a product reference library database, the existing products identified based on attribute levels associated with the first attributes;
- identify attributes shared between the new product and the existing products in a target market based on a degree of similarity between the first attributes and the second attributes;
- generate a theoretical co-penetration matrix including theoretical co-penetration values between the attributes shared between the new product and at least one of the existing products;
- access, via the network, product market activity data from a panelist database including purchase data from merchants;
- generate an empirical co-penetration matrix based on the product market activity data, the empirical co-penetration matrix including actual co-penetration values between the attributes shared between the new product and at least one of the existing products;
- reduce a model-based fair share sourcing error by calculating attribute distance values based on a ratio of corresponding pairs of the theoretical and actual co-penetration values of the theoretical and empirical co-matrices, respectively, to generate a distance matrix;
- calculate a percent volume of the new product expected to be sourced from one of the existing products based on the attribute distance values of the distance matrix;
- generate a forecast corresponding to sourcing the new product based on the percent volume; and
- cause sourcing of the new product based on the forecast.

13. The machine-readable storage device or storage device as defined in claim 12, wherein the instructions, when executed, cause the processor to calculate a substitutability index between the new product and the one of the existing products based on the attribute distance values.

14. The machine-readable storage device or storage device as defined in claim 13, wherein the instructions, when executed, cause the processor to base the substitutability index on a degree of polarization associated with at least one of the attributes shared between the new product and existing products in the target market.

15. The machine-readable storage device or storage device as defined in claim 14, wherein the instructions, when executed, cause the processor to weight the degree of polarization by the attribute distance values.

* * * * *